(12) United States Patent
Lee

(10) Patent No.: US 8,589,703 B2
(45) Date of Patent: Nov. 19, 2013

(54) TAMPER RESPONDENT COVERING

(76) Inventor: Cheol Jae Lee, Porter Ranch, CA (US)

( * ) Notice: Subject to any disclaimer, the term of this patent is extended or adjusted under 35 U.S.C. 154(b) by 0 days.

(21) Appl. No.: 13/556,101

(22) Filed: Jul. 23, 2012

(65) Prior Publication Data

US 2013/0283386 A1  Oct. 24, 2013

(30) Foreign Application Priority Data

Apr. 24, 2012  (KR) .......................... 10-2012-0042664

(51) Int. Cl.
*G06F 21/00* (2013.01)
(52) U.S. Cl.
USPC ........................................ 713/194; 257/922
(58) Field of Classification Search
None
See application file for complete search history.

(56) References Cited

U.S. PATENT DOCUMENTS

| 5,858,500 A | 1/1999 | MacPherson |
| 2002/0002683 A1 * | 1/2002 | Benson et al. ............... 713/194 |

FOREIGN PATENT DOCUMENTS

| GB | 258075 | 9/1926 |
| WO | 2005/098950 | 10/2005 |

* cited by examiner

*Primary Examiner* — Gilberto Barron, Jr.
*Assistant Examiner* — Izunna Okeke
(74) *Attorney, Agent, or Firm* — Lee, Hong, Degerman, Kang & Waimey

(57) ABSTRACT

Disclosed is a tamper respondent covering. The tamper respondent covering has a cover-shaped structure to cover an electronic part which is exposed. This covering protects electronic parts embedded inside or exposed outside a product, such as ICs that contains data concerning security and certification, communication connectors that transmit data, etc. from a tempering operation or an alternating operation. The tamper respondent covering protects data from a tampering operation or an altering operation by erasing the data or disabling operation of the electronic part containing the data in response to an act of attempting to remove the covering from a printed circuit board of the electronic part or to drill a hole in the covering.

6 Claims, 4 Drawing Sheets

TAMPER RESPONDENT COVERING

CROSS REFERENCE TO RELATED APPLICATIONS

Pursuant to 35 U.S.C. §119(a), this application claims the benefit of earlier filing date and right of priority to Korean Patent Application No. 10-2012-0042664 filed on Apr. 24, 2012, the contents of which are hereby incorporated by reference herein in their entirety.

BACKGROUND OF THE INVENTION

1. Field of the Invention

The present invention relates to a tamper respondent covering, and, more particularly to a tamper respondent covering that protects data from a tampering operation by covering electronic parts such as, integrated circuits (ICs) that are embedded inside or exposed outside a product and contain data concerning security and certifications, and communication connectors that transmit data, etc. using a cover-shaped structure and by erasing important data stored in the electronic part to be protected or disabling the operation of the electronic part when it detects tampering of the electronic part to be protected, for example, when someone attempts to remove the tamper respondent covering from a printed circuit board (PCB) of the electronic part or to drill a hole in the tamper respondent covering for the purpose of hacking the data in the electronic part.

2. Description of the Related Art

Enclosures or covers that enclose electronic parts have the form of envelopes and shallow boxes with walls which are formed by folding flexible sheets incorporating tampering detection characteristics. The sheet includes layers of flexible material in which a matrix of semi-conductive lines printed on an insulating film is incorporated. The matrix of semi-conductive lines forms a continuous conductor which breaks if there is an attempt to penetrate the insulating film. Since a circuit in the enclosures or covers has a conductor, the circuit is monitored by opening the conductor and measuring the resistance between the two ends of the circuit. The flexible sheets are folded and overlapped to create a wedge-, cuboid-, or cube-shaped enclosure as disclosed in GB 258 075 A in which a laminate is folded about a plurality of fold lines to form an enclosure. U.S. Pat. No. 5,858,500 discloses an envelope- or a box-shaped flexible sheet which is set in a sellable material.

The enclosure is intended to surround an item to be protected, such as an electronic device which may be an encryption module, a chip, or a circuit for processing which stores or carries potentially valuable information. As noted above, all attempts to penetrate the enclosure result in damaging to one or more of the lines, which is detected by the change in the electrical characteristics of the conductor. Upon detecting such a change, the valuable information stored in the item is typically erased or destroyed, and an alarm may be activated.

It may however be relatively time-consuming and expensive to enclose and surround the item with such an enclosure. Also, the provision of an enclosure which completely surrounds an item restricts the manner in which the item may be located and positioned within a larger device and is likely to, for example, preclude conventional surface mounting.

US Patent Application Publication No. US2002/0002683 A1 by Benson, et al. discloses a Security Module System that comprises a cover which encloses the components to be protected and abuts against the substrate, on which the components are mounted, using a ball grid array connection system. The cover comprises a serpentine pattern of metallic conductors which may be interconnected with a pattern of metallic conductors embedded in the substrate by a system of plated through-holes and blind vias to form a three dimensional array of conductors surrounding the components to be protected. To prevent the pattern and location of the metallic conductors from being detected by non-destructive techniques such as X-rays, back panels made of X-ray opaque material are laminated on the cover and the substrate.

Furthermore, to deter a chemical attack on the system, additional elements such as conductive ink fuses are provided on the substrate. The system disclosed has a number of shortcomings in relation to resistance to intrusive attacks, for example, the X-ray opaque back planes can be easily located and could be ground away or electrochemically etched, allowing the underlying pattern of metallic conductors to be exposed to X-rays or other non-destructive techniques. Areas of the metallic conductors could then be effectively bridged by attaching wire links to the serpentine pattern of conductors and the cover or substrate which was breached, without triggering the tamper respondent circuit.

Similarly, the vias in the side wall of the cover could be located and similarly bridged without triggering the tamper respondent circuit. The side walls are not protected by the pattern of serpentine conductors and therefore present an area susceptible to attack, as does the system of ball grid array interconnections.

It would also be possible by similar techniques to locate the positions of the conductive ink fuses on the circuit board and to direct a chemical attack at locations far away from the fuses without triggering a tamper response.

FIG. 1 illustrates a tamper respondent covering disclosed in PCT Publication No. WO2005/098950. In this patent document, the tamper respondent covering 10 is adapted for mounting on a surface having at least one item 3 and 4 disposed thereon, and the tamper respondent covering 10 includes a cover member defining a recess 7 and at least one non-metallic detecting element having an electrical characteristic disposed on the cover member. That is, the cover member is adapted for mounting on the surface and covering and protecting the at least one item 3 (and 4) on the surface such that damage to the at least non-metallic detecting element results in a detectable variation in the electrical characteristics.

The inventor of the present application invented a device that can reliably detect an external shock or attack even when the device is applied to any type of product by improving the technology disclosed in PCT Publication No. WO2005/098950.

SUMMARY OF THE INVENTION

Accordingly, the present invention has been made keeping in mind the above problems occurring in the related art, and is intended to provide a tamper respondent covering which protects data from tampering or altering by covering exposed electronic parts, such as ICs embedded inside or exposed outside a product and containing data concerning security and certification, and communication connectors that transmit data, using a cover-shaped structure so that the electronic parts can be protected from tampering and alteration, and by erasing important data or disabling the operation of the electronic part, in response to an attempt to remove the covering from a printed circuit board of an electronic device or drilling a hole in the covering for the purpose of hacking the data.

In order to achieve an object of the invention, according to one aspect of the present invention, there is provided a tamper respondent covering that protects data stored in an electronic part so that the data will not be illegally leaked by an external attack by erasing the data stored in the electronic part to be protected from an external shock or attack, or by disabling the operation of the electronic product, the tamper respondent covering including: a power supply that supplies power; a cover having a predetermined shape and covering a device to be protected; a substrate on which the device to be produced is mounted; the device to be protected, which is mounted on the substrate; a metallic portion that forms a external surface of the cover; a conductive coating layered on an internal surface of the cover; an insulating coating, interposed between and electrically isolating the metallic portion and the conductive coating from each other; a contact formed at a predetermined portion of the conductive coating; a connector electrically connected to the contact and formed between the cover and the substrate; a tamper detecting device that detects the electrical disconnection of the connector from the contact; and a controller that erases data of the device or disables operation of the device in response to a signal transmitted from the tamper detecting device.

According to the present invention, when the tamper covering of the present invention is provided for an electronic device equipped with an important electronic part to be protected, a tampering operation wherein it is attempted to remove the covering from the substrate or to drill a hole in the covering is detected, and then the operation of the electronic part to be protected is disabled or data is erased. Accordingly, the covering of the present invention has the advantage of preventing the electronic device to be protected from being illegally used.

BRIEF DESCRIPTION OF THE DRAWINGS

The above and other objects, features and further advantages of the present invention will be more clearly understood from the following detailed description when taken in conjunction with the accompanying drawings, in which.

DETAILED DESCRIPTION OF THE INVENTION

Hereinbelow, a tamper respondent covering according to an embodiment of the present invention will be described in detail with reference to the accompanying drawings. Throughout the drawings, elements that are substantially the same or similar are denoted by the same or similar reference signs.

Figure 1:
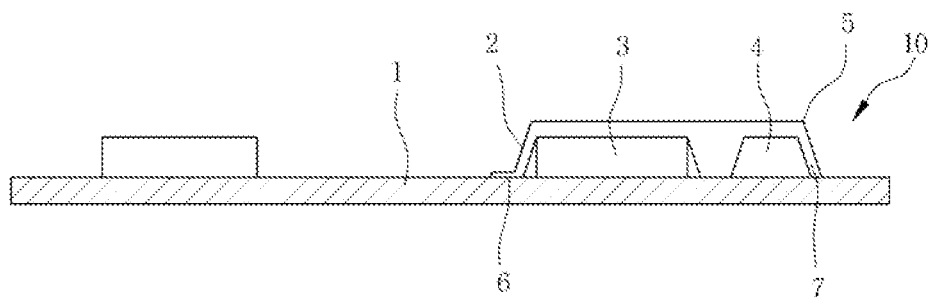
FIG. 1 is a cross-sectional view illustrating a tamper respondent covering according to a related art.
Figure 2:
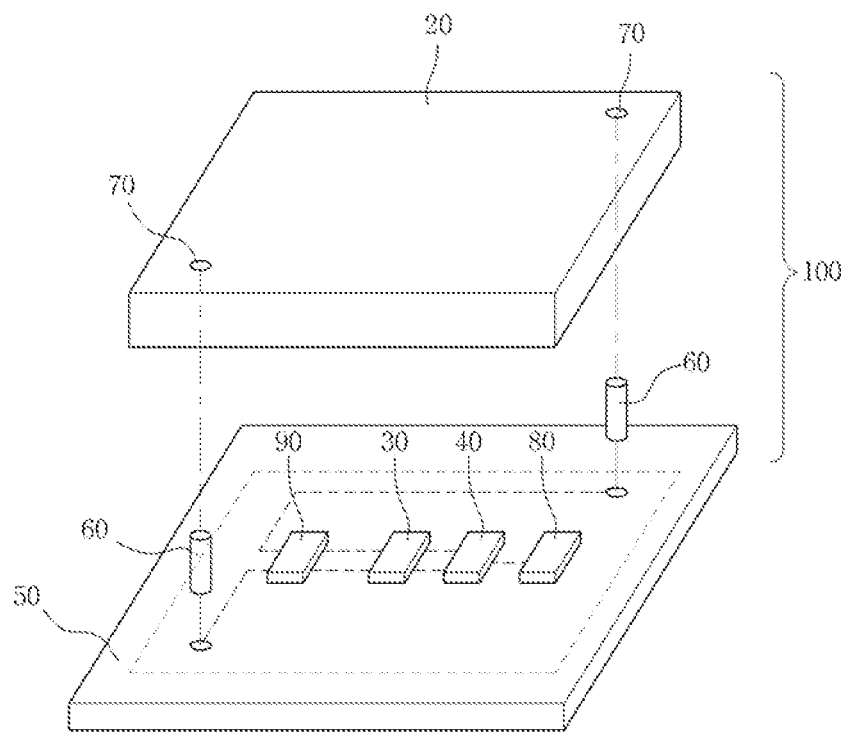
FIG. 2 is a perspective view illustrating a tamper respondent covering according to a first embodiment of the present invention.
Figure 2:
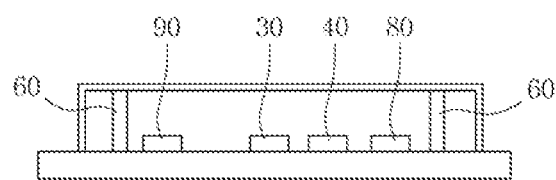

FIG. 2 is a perspective view illustrating a tamper respondent covering according to a first embodiment of the present invention.

A temper respondent covering 100 includes a cover 20, devices 30 and 40 mounted on a Printed Circuit Board (PCB), a connector 60 made of a conductive rubber or a metal, a contact connected to the connector 60, and a controller 80. The covering 100 further includes a power supply unit 90 to supply power because the covering 100 is a portable part. The power supply unit 90 may be provided as a battery. The battery may be, but is not limited to, a lithium battery or a lithium ion battery. Any type of battery can be used as long as these have the same or equivalent function as the exemplary batteries.

The device 30 detects a tampering operation, and the device 40 is a storage device in which data concerning security or certification is stored. When an external shock is applied to the covering, for example, when someone attempts to remove the substrate 50 from the covering 20 or to drill a hole in the covering 20, the following operation is performed: the connector 60 is disconnected from the contact 70; at the same time, a change in an electrical characteristic attributable to the disconnection is detected by the device 30 for detecting the tamper; a signal is transmitted from the tamper detecting device 30 to the controller 80; and finally the controller 80 erases the data stored in the device 40 to be protected or disables the operation of the device 40. The cover 20 and the substrate 50 are coupled to each other using screws or other locking means. The cover 20 and the substrate 50 can be separated by unscrewing the screw or unlocking the locking means.

Figure 3A:
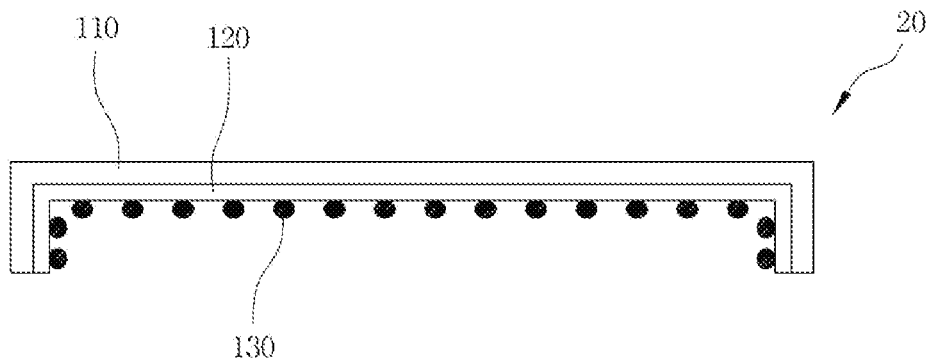
FIG. 3A is a cross-sectional view illustrating a cover portion according to the first embodiment.
Figure 3B:
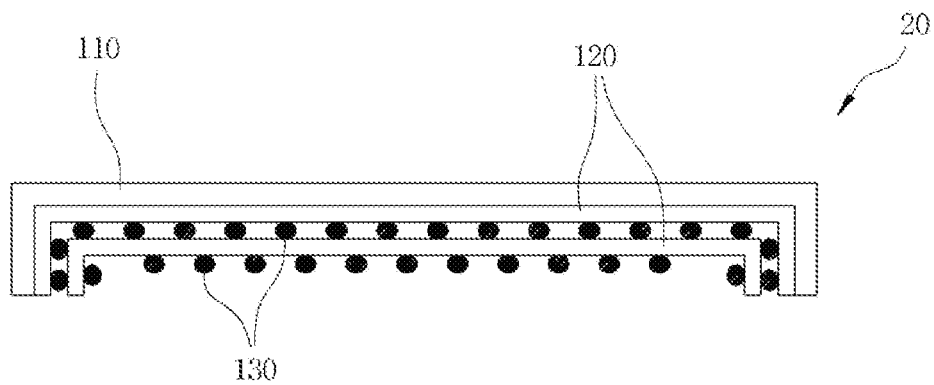
FIG. 3B is a cross-sectional view illustrating a cover portion according to a second embodiment.
Figure 3C:
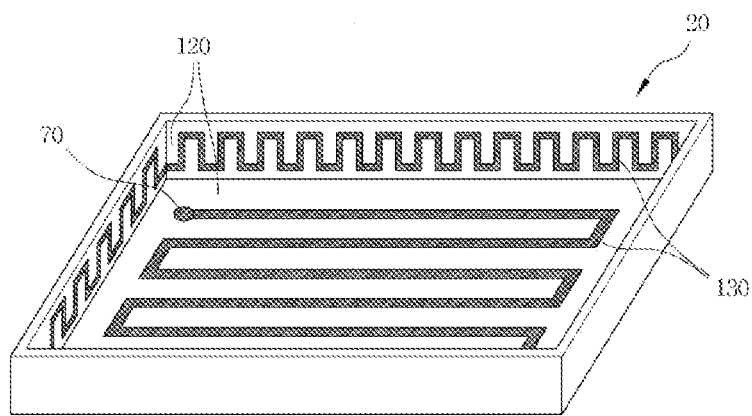
FIG. 3C is a diagram illustrating an internal structure of the covering according to the first embodiment.

FIG. 3A is a cross-sectional view illustrating a cover according to the first embodiment, FIG. 3B is a cross-sectional view illustrating a cover according to a second embodiment, and FIG. 3C is a diagram illustrating an internal structure of the cover according to the first embodiment.

Referring to FIG. 3A, the cover 20 includes a metallic portion 110 made of rigid material, a conductive coating 130 of a strip shape made of conductive material, and an insulating coating 120 that is interposed between the metallic portion 110 and the conductive coating 130 to electrically isolate the conductive coating 130 and the metallic portion 110 from each other.

Referring to FIG. 3B, this embodiment is different from the embodiment of FIG. 3A in that a conductive coating 130 and an insulating coating 120 each have a multilayered structure. With this structure, it is possible to more reliably detect the tampering operations of drilling a hole in the covering or separating the cover 20 and the substrate 50 from each other. FIG. 3B illustrates the multilayered structure composed of two layers. However, the multilayered structure is not limited to the one with two layers but may be a one with three or more layers.

FIG. 3C illustrates the conductive coating 130 in detail. As described above, the conductive coating 130 has a strip shape and a pattern of rectangular waves, but may not be limited thereto. For example, if a hole is drilled through the conductive coating 130, the pattern of the conductive coating 130 is disrupted such that electrical change is detected due to the disruption of the pattern of the conductive coating 130.

FIG. 2 and FIGS. 3A to 3C illustrate a structure in which the cover and the substrate are combined. However, a power supply device, a detecting device, a connector, and a controller may be embedded in the cover, so that the cover may be used alone without being combined with the substrate.

Figure 4A:
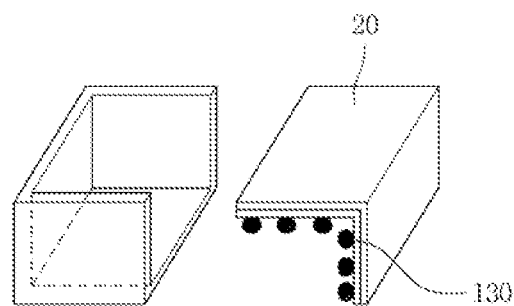
FIGS. 4A and 4B are perspective views illustrating various shapes of the tamper respondent covering according to the present invention.
Figure 4B:
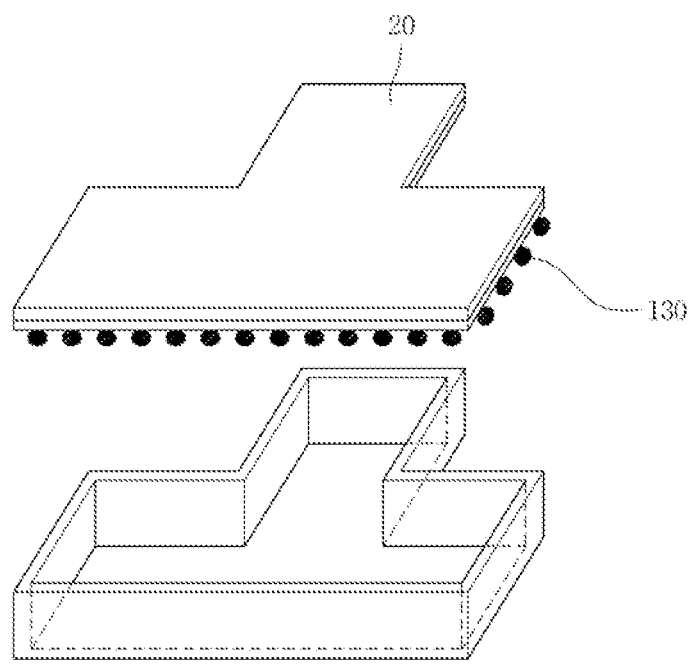

FIGS. 4A and 4B are perspective views illustrating tamper respondent covers of various shapes.

As illustrated in the drawings, the tamper respondent covering of the present invention has a rectangular shape as illustrated in FIG. 4A, or an inverted T shape as illustrated in FIG. 4B. However, such shapes are presented only by way of example but may be modified into various forms.

As described above, when the tamper respondent covering of the present invention is applied to an important electronic part to be protected, tampering operations such as removing the cover from the substrate or drilling a hole in the covering is detected, and then the electronic part to be protected will be disabled or data in the electronic part will be erased. Accordingly, it is possible to protect the device to be protected from being used illegally.

The covering of the present invention can be applied, but not limitedly, to communication connectors, payment card slots, circuit boards, magnetic strip card reader heads, products used under certification, card reader terminals, PIN input devices, Automatic Teller Machines (ATMs), card reader terminals for gas stations, etc. The covering of the present invention can be applied to equivalents of the above examples.

Although embodiments of the tamper respondent covering according to the present invention have been described with reference to the accompanying drawings for illustrative purpose, those skilled in the art will appreciate that various modifications, additions and substitutions are possible, without departing from the scope and spirit of the invention as disclosed in the accompanying claims.

What is claimed is:

1. A tamper respondent covering that prevents data that is stored in an electronic part from being accessed as a result of an external shock or attack by erasing the data or by disabling operation of the electronic part, the tamper respondent covering comprising:
   a power supply device which supplies power;
   a cover of a predetermined shape, the cover covering a device to be protected, the device including the electronic part;
   a substrate on which the device is mounted;
   a metallic portion, which forms an external surface of the cover;
   a conductive coating, which has a multilayered structure and is coated on an internal surface of the cover;
   a first insulating coating that is interposed between the metallic portion and the conductive coating in order to electrically isolate the metallic portion and the conductive coating from each other;
   a contact formed at a portion of the conductive coating;
   a connector that is disposed between the cover and the substrate with one end of the connector contacting a receiving portion of the substrate and the other end of the connector electrically connected to the contact, the connector disconnectable from the contact in response to the external shock or attack;
   a tamper detecting device that is mounted on the substrate and detects an electrical disconnection between the connector and the contact when the connector is disconnected from the contact;
   a second insulating coating that is interposed between multilayered conductive coatings; and
   a controller configured to:
      erase the data stored in the electronic part when the electrical disconnection is detected; or
      disable operation of the device in response to a signal transmitted from the tamper detecting device when the electrical disconnection between the connector and the contact is detected,
   wherein the multilayered conductive coating comprises more than two layers of the conductive coating such that each of a multilayered insulating coating is interposed between layers of the multilayered conductive coating.

2. The tamper respondent covering according to claim 1, wherein the predetermined shape of the cover corresponds to a shape of the device.

3. The tamper respondent covering according to claim 1, further comprising a fixing unit that holds the cover and the substrate together.

4. A tamper respondent covering that protects data stored in an electronic part to be protected from an external shock or attack by erasing the data or by disabling operation of the electronic part, the tamper respondent covering comprising:
   a power supply device that supplies power;
   a cover that covers the electronic part;
   a metallic portion that forms an external surface of the cover;
   a conductive coating having a multilayered structure and layered on an internal surface of the cover;
   an insulating coating interposed between the metallic portion and the conductive coating such that the metallic portion and the conductive coating are electrically isolated from each other;
   a contact formed at a portion of the conductive coating;
   a connector electrically connected to the contact and formed in the cover, the connector disconnectable from the contact in response to the external shock or attack or when the cover is improperly open to expose the electronic part;
   a tamper detecting device installed in the cover to detect an electrical disconnection between the connector and the contact when the connector is physically disconnected from the contact; and
   a controller installed in the cover and configured to erase the data in the electronic part or disable operation of the electronic part in response to a signal transmitted from the tamper detecting device when the electrical disconnection between the connector and the contact is detected,
   wherein the insulating coating has a multilayered structure and the multilayered conductive coating comprises more than two layers of the conductive coating such that each of the multilayered insulating coating is interposed between layers of the multilayered conductive coating.

5. The tamper respondent covering according to claim 3, wherein the fixing unit comprises screws such that the cover is separable from the substrate by unscrewing the screws.

6. The tamper respondent covering according to claim 3, wherein the fixing unit comprises locking means such that the cover is separable from the substrate by unlocking the locking means.

* * * * *